(12) United States Patent
Blackman et al.

(10) Patent No.: US 8,765,071 B2
(45) Date of Patent: Jul. 1, 2014

(54) GAS GENERATING DEVICE AND METHOD OF MANUFACTURING GAS GENERATING DEVICE

(75) Inventors: Donald Blackman, Bradenton, FL (US); Brian Ford, Seminole, FL (US)

(73) Assignee: Carleton Technologies, Inc., Orchard Park, NY (US)

( * ) Notice: Subject to any disclaimer, the term of this patent is extended or adjusted under 35 U.S.C. 154(b) by 236 days.

(21) Appl. No.: 13/529,576

(22) Filed: Jun. 21, 2012

(65) Prior Publication Data
US 2012/0328481 A1  Dec. 27, 2012

Related U.S. Application Data

(60) Provisional application No. 61/500,009, filed on Jun. 22, 2011.

(51) Int. Cl.
*B01J 7/00* (2006.01)

(52) U.S. Cl.
USPC ........... 422/236; 422/164; 422/165; 422/166; 422/305

(58) Field of Classification Search
CPC ...................................... B01J 7/00; B01J 7/02
USPC .................. 422/236, 164, 165, 166
See application file for complete search history.

(56) References Cited

U.S. PATENT DOCUMENTS 3,785,674 A * 1/1974 Poole et al. ............... 280/741

* cited by examiner

*Primary Examiner* — Lessanework Seifu
(74) *Attorney, Agent, or Firm* — Jaeckle Fleischmann & Mugel, LLP

(57) ABSTRACT

Disclosed is a device for generating a volume of gas from solid and liquid generates. In one particular embodiment, a volume of nitrogen gas is generated by combining the output of Sodium Azide and liquid nitrogen. A vacuum is initially maintained about the liquid nitrogen container by way of a dewar jacket. The present disclosure also relates to a method of manufacturing the disclosed gas generating device.

20 Claims, 7 Drawing Sheets

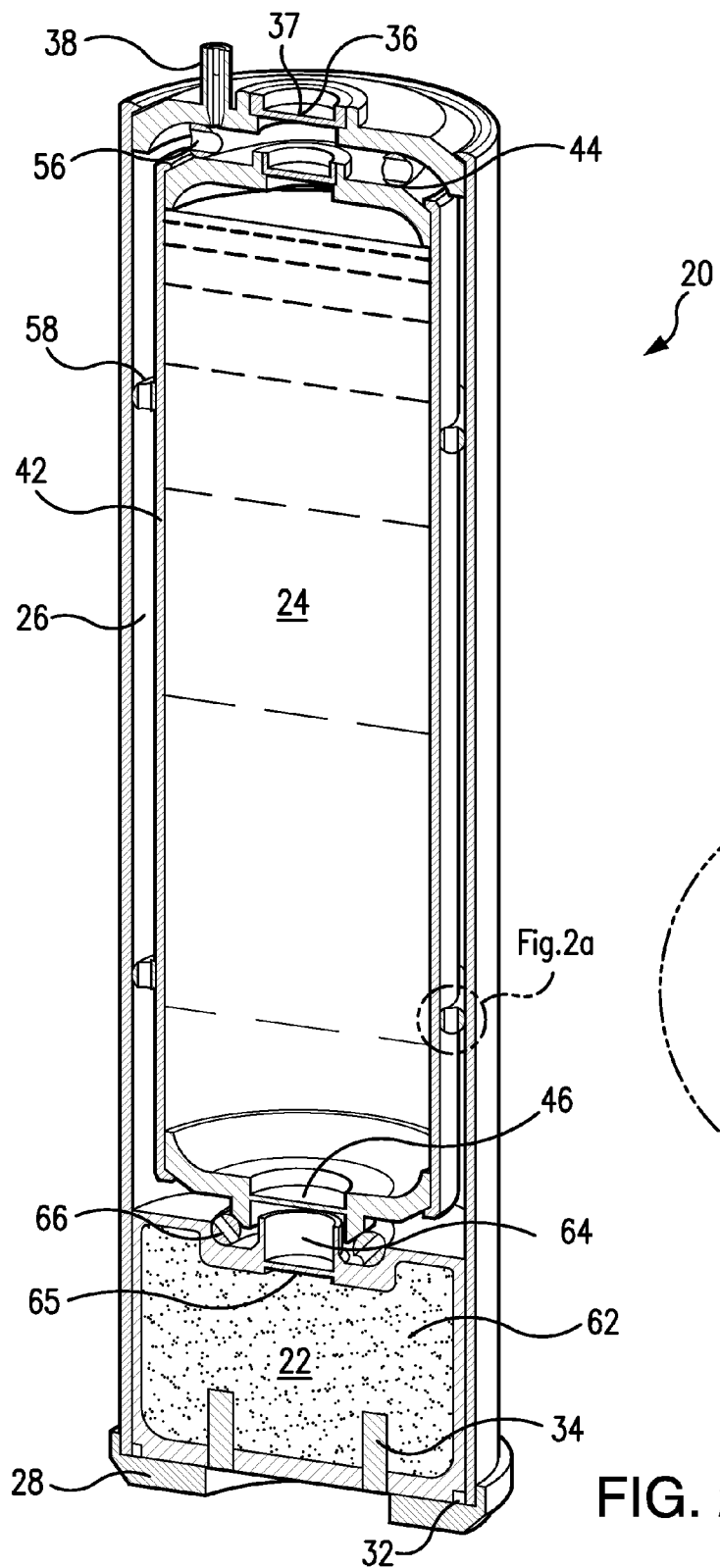
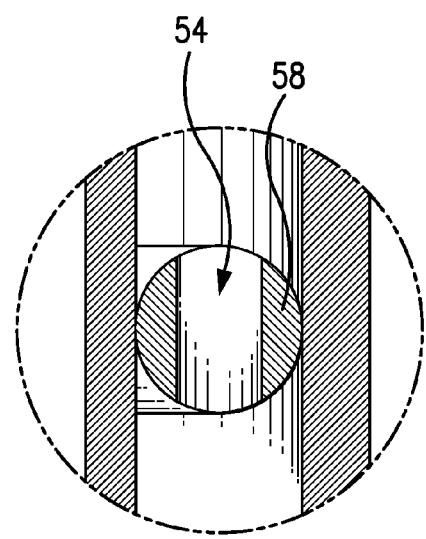
FIG. 2
FIG. 2a

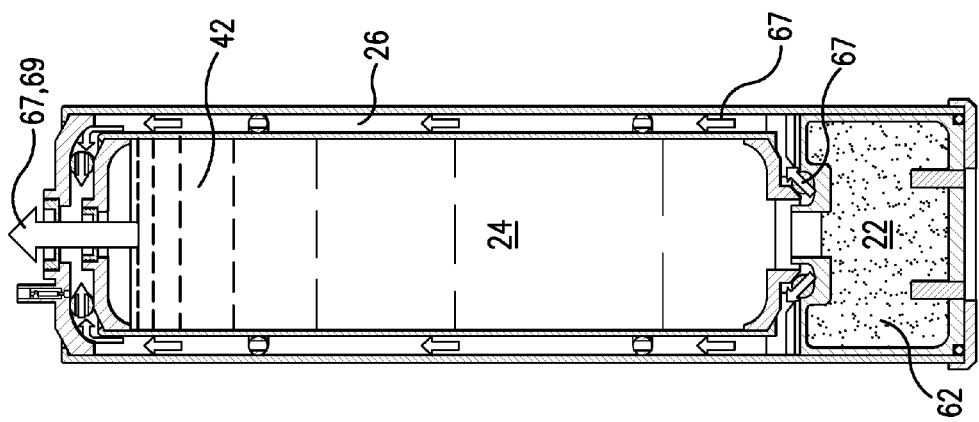
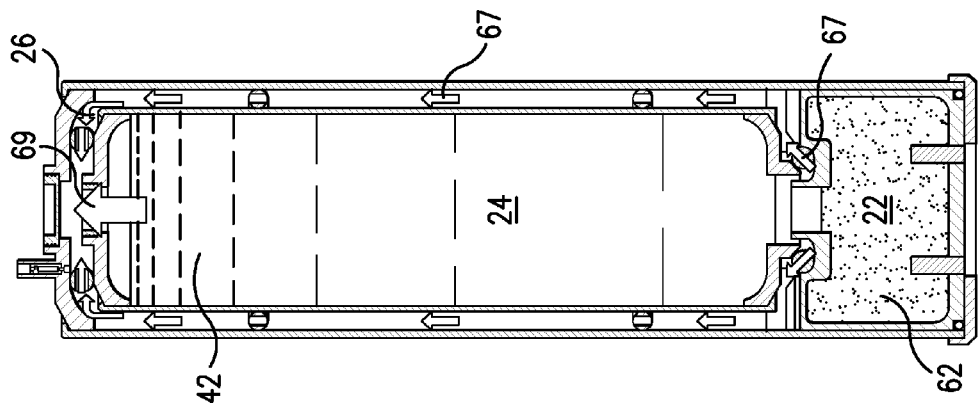

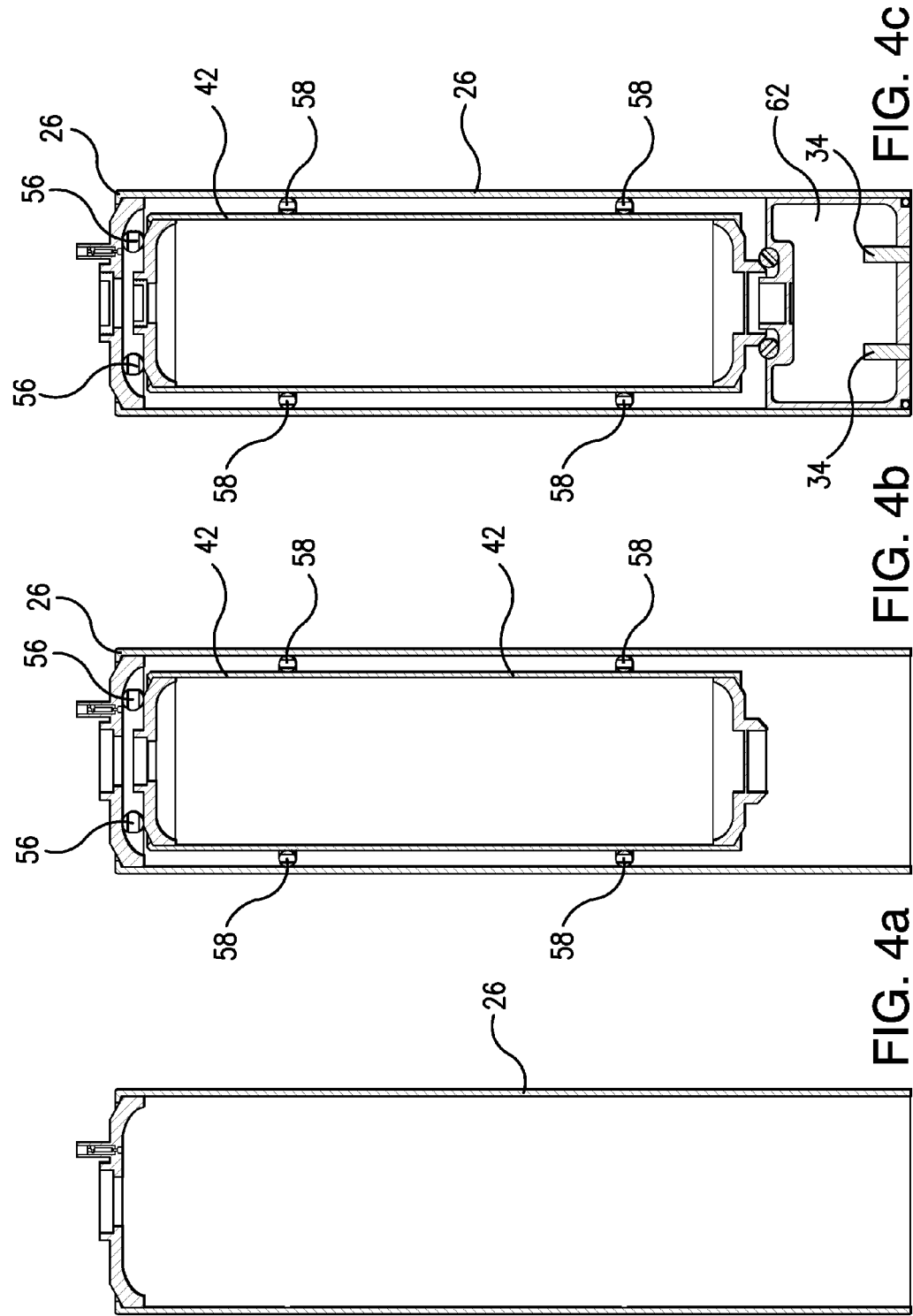

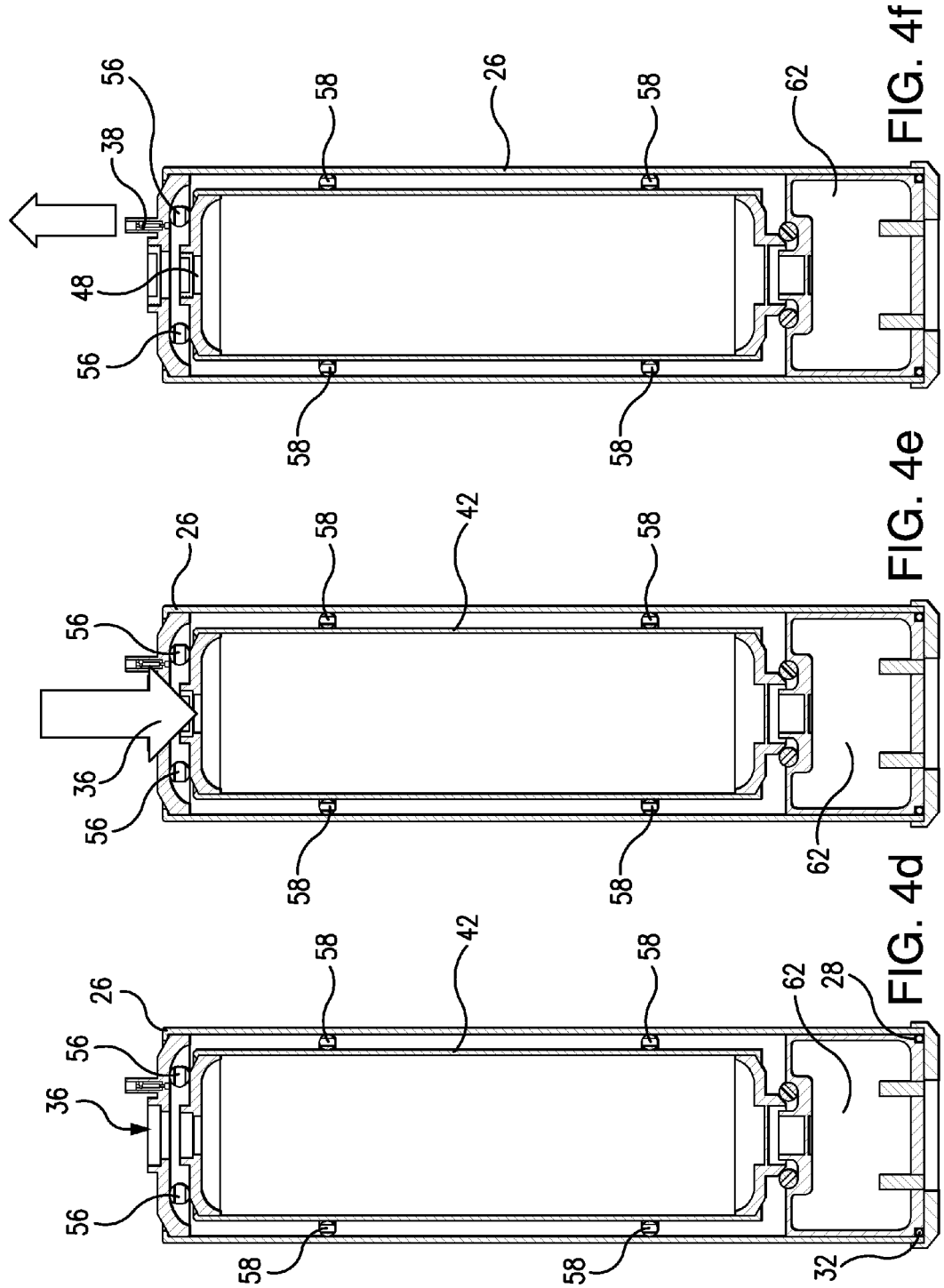

US 8,765,071 B2

GAS GENERATING DEVICE AND METHOD OF MANUFACTURING GAS GENERATING DEVICE

CROSS-REFERENCE TO RELATED APPLICATIONS

This application claims priority to co-pending provisional patent application Ser. No. 61/500,009 filed on Jun. 22, 2011, and entitled "Gas Generating Device And Method Of Manufacturing Gas Generating Device." The contents of this co-pending application are fully incorporated herein for all purposes.

BACKGROUND OF THE INVENTION

1. Field of the Invention

This invention relates to a gas generating device. More particularly, the present invention relates to a device for generating gas from liquid and solid generants.

2. Description of the Background Art

The use of gas generators is known in the art. Gas generators can use either a solid or liquid generate to produce a volume of gas. Solid generates typically employ a chemical or thermal reaction to convert the solid into a pressurized gas. Liquid generates use heat to convert the liquid into a pressurized gas. In either case, the generated gas can be used to inflate an article.

However, there are significant drawbacks to using solid or liquid generates. One drawback involves the temperature of the generated gases. Liquid generates tend to produce gases that are very cold. Liquid generates also require a uniform heat source in order to convert the liquid into gas. Solid generates suffer from the drawback that they tend to produce hot gases. Thus, there exists a need in the art to generate gases of a moderate temperature. There also exists a need in the art to provide a uniform heat source for liquid generates. The gas generating device of the present disclosure is aim at fulfilling these and other needs.

SUMMARY OF THE INVENTION

It is therefore an object of this disclosure to provide a gas generator that yields gases of a moderate temperature.

Another advantage of the present device is accomplished by using both solid and liquid generates in the production of an inflation gas.

Yet another advantage is achieved by initially storing a liquid generate in a vacuum.

Still yet another advantage is realized in utilizing the product of a solid generate to heat an adjacent liquid generate.

A further advantage is attained by generating inflation gases of an ambient and homogenous temperature whereby the generated gases can be used in spaced based applications.

Another advantage is realized by generating a large volume of gas from a device that is smaller than typical stored gas devices.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 2 is a perspective sectional view of the gas generating device.

FIG. 2(a) is a detailed view taken from FIG. 2.

FIG. 3(a)-3(e) are sequential views of the gas generating process.

FIG. 4(a)-4(f) are sequential views of the method of constructing the disclosed gas generating device.

Similar reference characters refer to similar parts throughout the several views of the drawings.

DETAILED DESCRIPTION OF THE PREFERRED EMBODIMENT

Figure 1:
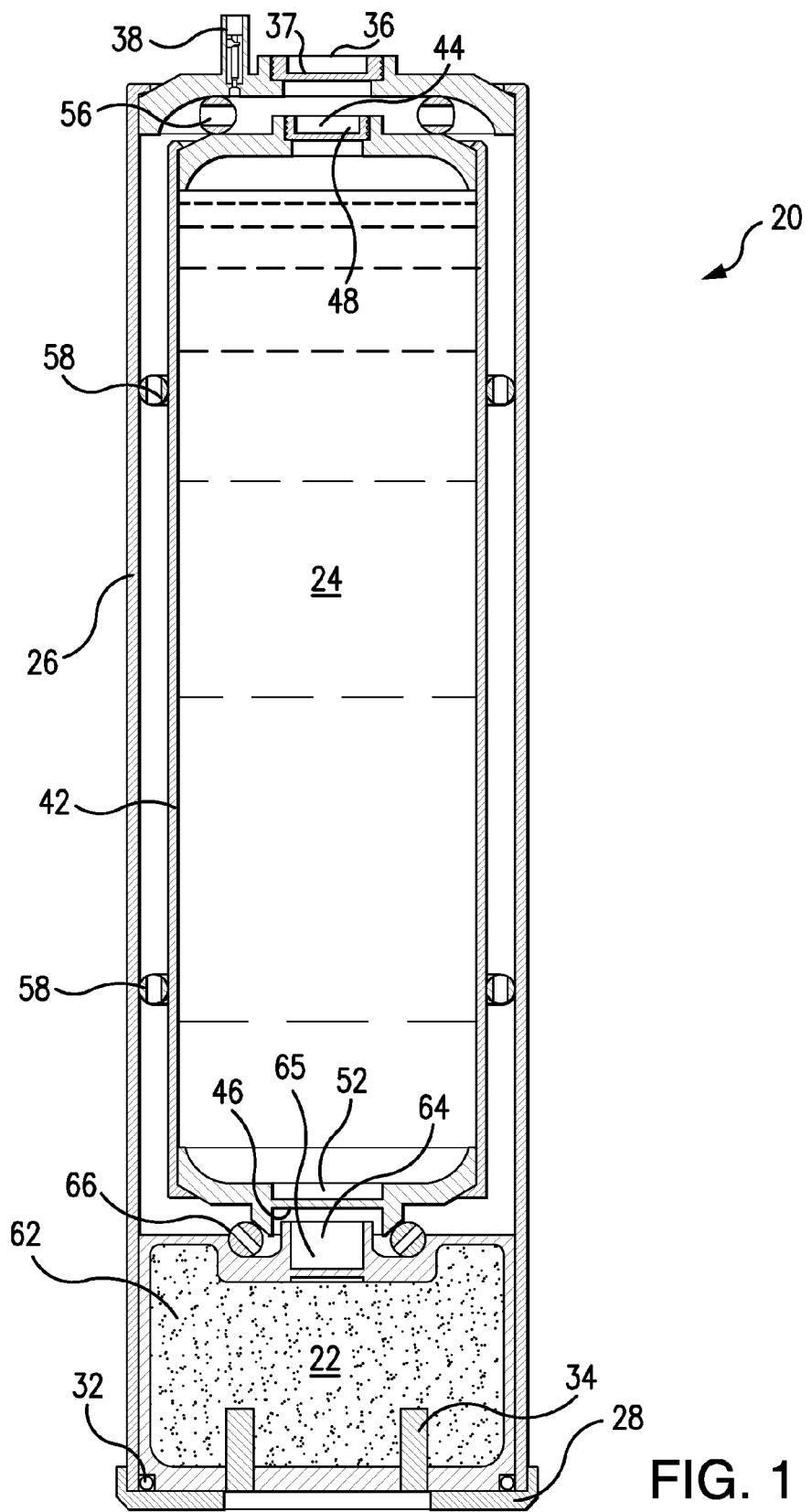
FIG. 1 is sectional view of the gas generating device.

The present disclosure relates to a device for generating a volume of gas from solid and liquid generates. In one particular embodiment, a volume of nitrogen gas is generated by combining the output of Sodium Azide and liquid nitrogen. A vacuum is initially maintained about the liquid nitrogen container by way of a dewar jacket. The present disclosure also relates to a method of manufacturing the disclosed gas generating device. The various components of the present invention, and the manner in which they interrelate, are described in greater detail hereinafter.

Outer Housing

Device 20 stores a solid generate 22 and a liquid generate 24 within an outer housing 26. In the depicted embodiment, outer housing 26 is a cylindrically shaped container formed from a carbon fiber wrap. The use of other materials and shapes is within the scope of the present invention. Outer housing 26 has upper and lower extents. The lower extent is enclosed by a pressure cap 28 that is sealed via an O-ring 32. Pressure cap 28 includes an opening to allow for an electrical connection to a pair of redundant squibs 34 that initiate combustion of the solid generate.

The upper extent of housing 26 includes a plug 36 and a check valve 38. Plug 36 also includes a burst disc 37. Check valve 38 can be any of a variety of commercially available check valves and is used for drawing a vacuum within the interior of housing 26. Plug 36 permits device 20 to be removably coupled to an article to be inflated. In this regard, plug 36 could include a threaded extent or a bayonet-type coupling to permit device 20 to be releasably, but securely, coupled to a corresponding element on the inflatable article.

Liquid Generate

The liquid generate 24 is preferably a cylindrical liquid container 42 with upper and lower openings (44 and 46) that are secured with burst or rupture discs (48 and 52). As is known in the art, a burst disc is a non-reclosing pressure relief device that breaks upon application of over-pressurization. In the preferred embodiment, liquid container 42 stores a volume of liquid nitrogen. The initial temperature of the liquid nitrogen is very cold and on the order of −321° F. Upon heating the liquid nitrogen, it is converted into a pressurized gas, which ruptures the upper burst disc 48 to escape from container 42. The use of other liquid generates is, however, within the scope of the present invention. It is also within the scope of the present invention to use a fill port in place of burst disc 48. This embodiment may be desired if the gas leaving liquid container 42 is not sufficient to rupture disc 48.

Liquid container 42 is mounted within housing 26 by a series of mounting rings 56 and 58. Rings 56 and 58 are preferably annular in shape. In the preferred embodiment, each of the mounting rings is formed from a ceramic and includes a through hole 54 (note FIG. 2a). An upper mounting ring 56 is positioned between the upper opening 44 of liquid container 42 and the upper extent of housing 26. Intermediate mounting rings 58 can be positioned between the outer surface of liquid container 42 and the inner surface of housing 26. In the depicted embodiment, the diameter of the upper mounting ring 56 is smaller than the diameter of the intermediate mounting rings 58. The mounting rings serve a number of purposes. They insulate liquid container 42 from shocks and vibration. The through holes permit the passage of fluids, to thereby allow a vacuum to be drawn around the outside of liquid container 42. They further permit liquid container 42 to be thermally isolated from the remainder of device 20.

Solid Generate

Solid generate 22 is positioned within a solids container 62 that is positioned within housing 26 immediately below liquid container 42. In the preferred embodiment, solid generate 22 is sodium azide ($NaN_3$) which combusts to generate nitrogen gas in accordance with the following equation: $2 NaN_3 \rightarrow 2 Na + 3 N_2$. The lower extent of the solids container is coupled to the pair of squibs 34 that are used in igniting the sodium azide. The upper extent of solids container 62 includes a nozzle 64 that is in facing relation with lower burst disc 52 of liquid container 42. A burst disc 65 can also be included over the opening of solids container 62. A lower mounting ring 66 is positioned at the interface of solids container 62 and liquid container 42. As with the other mounting rings, this lower mounting ring 66 includes through holes 54. Lower mounting ring 66 is also annular in shape.

Operation

In operation, housing 26 is first coupled to an article to be inflated. Device 20 lends itself to space based applications due to its lightweight construction and the moderate temperature of the gases generated. Accordingly, device 20 can be coupled articles such as, but not limited to, inflatable housing units for astronauts, inflatable heat shields for space vehicles, landing cushions, or aero shells. Any of a wide variety of space based inflatable articles would benefit from inflation device 20.

Figure 3C:
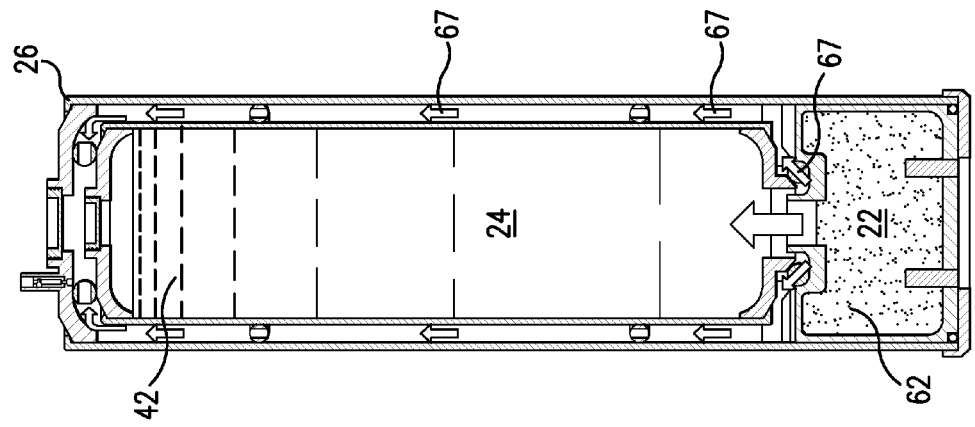
Figure 3B:
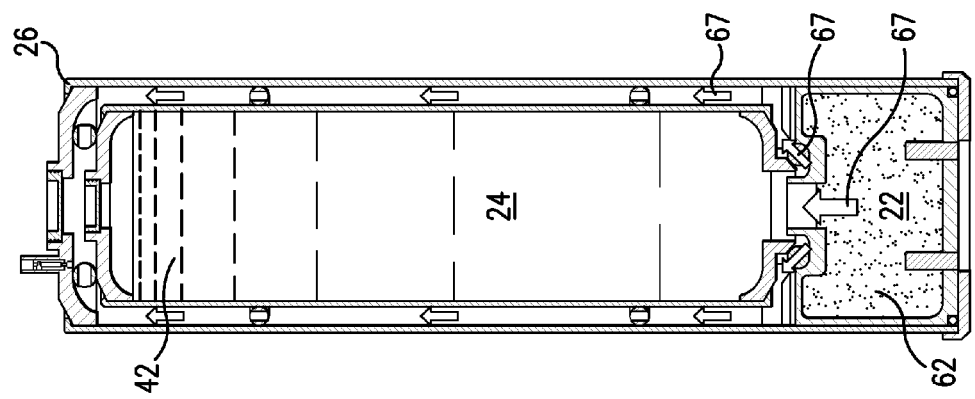
Figure 3A:
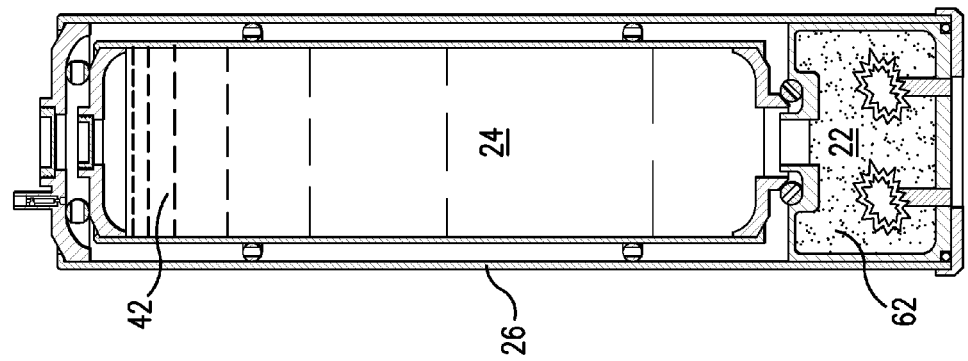
Figure 5:
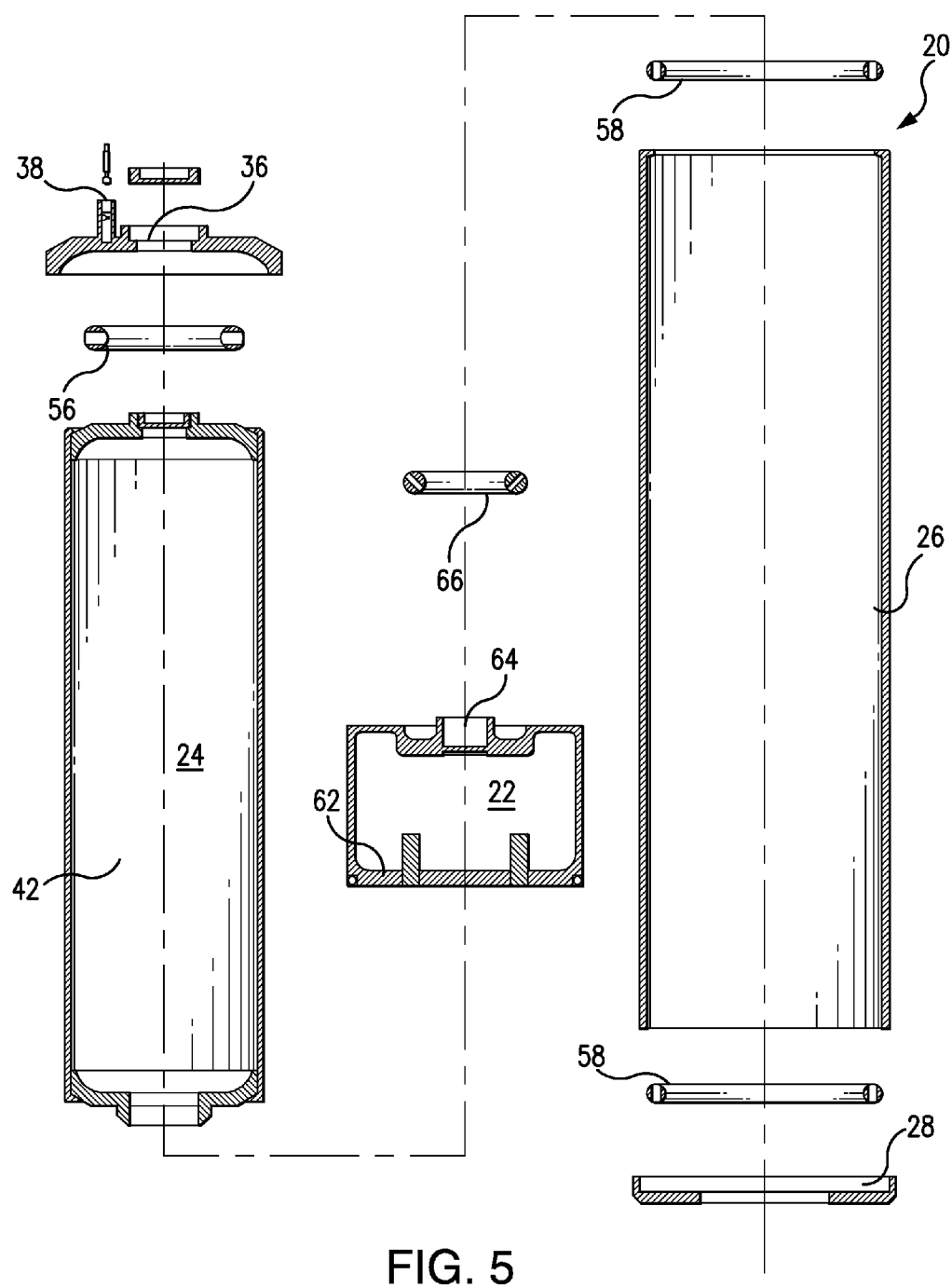
FIG. 5 is an exploded view of the gas generating device.

Once device 20 is coupled to the inflation article, it can be safely stored until needed. Because neither the solid or liquid generates (22 and 24) are stored under pressure, the housing can be formed from lighter weight materials, such as carbon fiber composites. One inflation is needed, squibs 34 are triggered to ignite the solid generate 22 (note FIG. 3(a)). In the case of sodium azide, this causes a volume of hot nitrogen gas to be generated. The combustion temperature of the sodium azide is approximately 1020° F. This hot gas 67 then is accelerated as it passes through nozzle 64. The accelerated gas 67 then ruptures burst disc 52 of liquid container 42 (note FIG. 3(b)). Disc 65 is also ruptured if present. A significant volume of the gas 67 quickly fills the vacuum surrounding liquid container 42 (note FIG. 3(c)). As a result, liquid container 42 is very rapidly immersed in hot gas. This, in turn, provides a uniform heat source for the liquid generate. The majority of the hot gas 67 leaving solids container 62 passes through burst discs 52 and 65 to enter liquid container 42.

As liquid generate 24 (which in the preferred embodiment is liquid nitrogen) is uniformly heated the liquid is converted into gas 69 (note FIG. 3(d)-3(e)). As this gas is converted from its liquid state, it expands and increases in pressure. Gas 69 will combine with gas 67 from solid generate 22 (note FIG. 3(e)). Once the pressure is sufficient, the upper burst disc 48 is broken and nitrogen gas 69 escapes from housing 42 and mixes with the gas 67 already beginning to surround housing 42. Once sufficient pressure has accumulated, the burst disc 37 within plug 36 ruptures, allowing gas to be supplied to inflate the article with gases 67 and 69 (note FIGS. 3(d) and 3(e)). Alternatively, if burst disc 48 is omitted from opening 44, the generated gas leaves container 42 via a fill port and then encounters and ruptures disc 37 to escape device 20.

The volume of the liquid and solid generates (24 and 22) will depend upon the intended application and the size of the article to be inflated. In the depicted embodiment, the liquid generate produces 0.63 kg of gas and the solid generate produces 0.28 kg of gas. Hence, approximately 69% of the gas is supplied from liquid container 42 and the remaining 31% is generated from the solids container 62. In an important aspect of the invention, by combining the hot gas of the solid generate 22 with the cold gas of the liquid generate 24, a more regulated final temperature is achieved. Namely, it has been determined that using the ratios supplied above, and assuming a combustion temperature of Sodium Azide of approximately 1020° F. and an initial temperature of liquid nitrogen of approximately −321° F., the resulting gas temperature is approximately 91° F. Calculations showing the temperature of the output gas are included below:

Initial Temperature of liquid nitrogen (LN2): −196° C.=−321° F.=77 K
Combustion Temperature of Sodium Azide (NaN3): 549° C.=1020° F.=823 K
Density of LN2 (pLN2): 50.4 lb/ft3
Density of GN2 (pGN2): 35.56 lb/ft3
Atomic Mass of N2 (MN2): 28 g/mol
Specific Heat of N2: 0.743 KJ/kg-K Assuming 69% of the exit gas is supplied by converting liquid nitrogen ($LN_2$) to gaseous nitrogen, and the remaining 31% of the gas is supplied by the combustion of Sodium Azide ($GN_2$), the following calculations were carried out.

Moles of LN2 (nLN2)=22.5 mol
Moles of GN2 (nGN2)=10 mol
Mass of LN2 (mLN2)=nM=0.63 kg
Mass of GN2 (mGN2)=nM=0.28 kg $$T_2 = \frac{(mC_vT_1)_{LN2} + (mC_vT_1)_{NaN3}}{(mC_v)_{LN2} + (mC_v)_{NaN3}} = 306 \ K = 91° \ F.$$

Wherein "m" is mass; "$C_v$" is specific heat; "$T_1$" is initial temperature; and "T2" is homogeneous gas temperature.

Manufacturing Method

In the first step of the manufacturing method, an empty dewar housing 26 is provided (note FIG. 4(a)). The lower pressure cap 28 is removed. The upper and intermediate mounting rings (56 and 58) along with the liquid container 42 are then inserted into the interior of housing 26 (note FIG. 4(b)). Solids container 62 is then inserted below liquid container 42 (note FIG. 4(c)). Lower mounting ring 66 is positioned between container 42 and container 62. In the depicted embodiment, solids container 62 is filled with sodium azide and contains two redundant squibs 34. The pressure cap and o-ring (28 and 32) are then fitted over the lower end of housing 26 (note FIG. 4(d)). A volume of liquid nitrogen is then supplied to the liquid container 42 through the plug 36 and upper opening (note FIG. 4(e)). The upper burst disc 48 is then fitted over the upper opening of liquid container 42 (FIG. 4(f)). Check valve 38 is then used to draw a vacuum and evacuate the interior of housing 26 (note FIG. 4(f)). As a result, a vacuum is generated in the area surrounding liquid container 42. Check valve 38 is then plugged and device 20 is ready for operation.

The present disclosure includes the foregoing description and the appended claims. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A device (20) for generating a gas from solid and liquid generates, the device (20) comprising:
    an outer cylindrical housing (26) formed from a carbon fiber wrap, the outer housing (26) having an interior area, an upper end, a lower end, and an intermediate extent therebetween, the lower end being enclosed by a pressure cap (28) and an o-ring seal (32), the upper end enclosed by a plug (36) and a burst disc (37), a check valve (38) mounted within the upper end of housing (26);
    an inner cylindrical container (42) containing a liquid nitrogen generate, the inner container (42) including an upper end, a lower end, and an intermediate extent therebetween, the upper end enclosed by a first rupture disc (48) and the lower end enclosed by a second rupture disc (52), the inner container (42) positioned within the interior area of the outer housing (26) to thereby create a space between the inner container (42) and the outer housing (26), a vacuum being created within the space by way of check valve (38);
    an upper ceramic mounting ring (56) positioned between the upper end of the inner container (42) and the upper end of the outer housing (26), the upper mounting ring (56) including a through hole to allow for the passage of a gas;
    a series of intermediate ceramic mounting rings (58) positioned between the intermediate extent of the inner container (42) and the intermediate extent of the outer housing (26), the intermediate mounting rings (58) each including a through hole to allow for the passage of a gas;
    a lower container (62) positioned within the interior area of outer housing (26), the lower container (62) containing a solid sodium azide generate (22), the lower container (62) including an upper nozzle (64) that is in facing relation with the second rupture disc (52) of the inner container (42), a squib (34) operatively connected to the lower container (62) and adapted to ignite the solid generate (22);
    a lower ceramic mounting ring (66) positioned between the inner container (42) and the lower container (62), the lower ceramic mounting ring (66) including a through hole to allow for the passage of gas;
    wherein ignition of the solid generate (22) by the squib (34) generates a hot gas (67) that is accelerated by nozzle (64) and ruptures disc (52), the hot gas (67) entering inner container (42) and the space between inner container (42) and outer housing (26), the hot gas (67) passing through the through holes in the lower ceramic mounting ring (66), the intermediate mounting rings (58), and the upper mounting rings (56), and wherein the hot gas (67) heats the liquid generate to generate a cold gas (69), the hot gas (67) and the cold gas (69) mixing within inner container (42), the mixed gas being of a moderate temperature, the mixed gas rupturing first disc (48) and burst disc (37) to thereby exit the device (20).

2. A device (20) for generating a gas from first and second generates, the device (20) comprising:
    an outer cylindrical housing (26) having an interior area and closed upper and lower ends, a burst disc (37) in the closed upper end;
    an inner cylindrical container (42) containing a first generate, the inner container (42) including closed upper and lower ends, a first rupture disc (48) in the closed upper end and a second rupture disc (52) in the closed lower end, the inner container (42) positioned within the interior area of the outer housing (26) and thereby creating a space between the inner container (42) and the outer housing (26);
    a lower container (62) containing a second generate (22), the lower container (62) including an opening (64) that is in facing relation with the second rupture disc (52) of the inner container (42), the lower container (62) being positioned within the interior area of the outer housing (26);
    wherein the second generate (22) can be ignited to generate a hot fluid (67) that passes through opening (64) to rupture disc (52), the hot fluid (67) entering inner container (42) and the space between inner container (42) and outer housing (26), and wherein the hot fluid (67) heats the first generate to generate a cold fluid (69), the hot fluid (67) and the cold fluid (69) mixing within inner container (42) and rupturing first disc (48), burst disc (37), and exiting device (20).

3. The device (20) as described in claim 2 wherein the outer housing (26) is formed from a carbon fiber wrap.

4. The device (20) as described in claim 2 further comprising a check valve (38) mounted within the closed upper end of housing (26), the check valve (38) functioning the draw a vacuum in the space between the inner container (42) and the outer housing (26).

5. The device (20) as described in claim 2 wherein the first generate is a liquid generate.

6. The device (20) as described in claim 2 wherein the second generate is a sold generate.

7. The device (20 as described in claim 2 wherein one of the generates is a liquid generate and other generate is a solid generate.

8. The device (20) as described in claim 2 wherein the first generate is liquid nitrogen.

9. The device (20) as described in claim 2 wherein the second generate is sodium azide.

10. The device (20) as described in claim 2 further comprising rings that are positioned between the inner container (42) and the outer housing (26), the rings creating a thermodynamic barrier between the inner container (42) and the outer housing (26).

11. The device (20) as described in claim 10 wherein the rings are formed from a ceramic material.

12. The device (20) as described in claim 11 wherein through holes are formed within the rings to allow for the passage of a fluid.

13. The device (20) as described in claim 2 wherein the hot fluid and the cold fluid mix to create a fluid of a moderate temperature.

14. A device for generating a fluid comprising:
    an outer housing having an interior and upper and lower ends, a closure in the upper end;

an inner container housing a first generate, the inner container having upper and lower ends, an upper disc in the upper end and a lower disc in the lower end, the inner container positioned within the interior of the outer housing;

a lower container positioned within the interior of the outer housing, the lower container housing a second generate, the lower container in communication with the lower disc;

wherein the second generate can be used to generate a hot fluid that ruptures the lower disc, the hot fluid entering inner container and heating the first generate, whereby the first generate creates a cold fluid, the hot fluid and the cold fluid mixing to produce a warm fluid, the warm fluid rupturing the upper disc and the closure to exit the device.

15. The device as described in claim 14 wherein the hot fluid is a gas with a temperature of approximately 1020° F.

16. The device as described in claim 14 wherein the cold fluid is a gas with a temperature of approximately −321° F.

17. The device as described in claim 14 wherein the warm fluid is a gas with a temperature of approximately 91° F.

18. The device as described in claim 14 wherein the first generate produces approximately 69% of the fluid produced by the device and the second generate produces approximately 31% of the fluid produced by the device.

19. The device as described in claim 14 further comprising a space between the inner container and the outer housing and wherein a vacuum exists within the space.

20. The device as described in claim 19 wherein the hot fluid fills the vacuum to surround the inner container and thereby provide a uniform heat source for the first generate.

\* \* \* \* \*